United States Patent
Benco et al.

(10) Patent No.: US 7,333,803 B2
(45) Date of Patent: Feb. 19, 2008

(54) NETWORK SUPPORT FOR VOICE-TO-TEXT MEMO SERVICE

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 299 days.

(21) Appl. No.: 10/760,864

(22) Filed: Jan. 20, 2004

(65) Prior Publication Data

US 2005/0159959 A1    Jul. 21, 2005

(51) Int. Cl.
*H04Q 7/38* (2006.01)
(52) U.S. Cl. ............... 455/414.4; 455/466; 379/88.14; 704/260
(58) Field of Classification Search ............. 379/88.14, 379/88.25; 455/412.1, 466, 414.4; 704/260
See application file for complete search history.

(56) References Cited

U.S. PATENT DOCUMENTS

| | | | |
|---|---|---|---|
| 6,507,735 B1* | 1/2003 | Baker et al. ............. | 455/412.1 |
| 6,745,021 B1* | 6/2004 | Stevens .................... | 455/404.1 |
| 6,925,307 B1* | 8/2005 | Mamdani et al. ........... | 455/466 |
| 6,990,180 B2* | 1/2006 | Vuori ...................... | 379/88.25 |
| 2004/0111265 A1* | 6/2004 | Forbes ....................... | 704/260 |

FOREIGN PATENT DOCUMENTS

KR    2005005144 A  *  1/2005

* cited by examiner

*Primary Examiner*—Gerald Gauthier

(57) ABSTRACT

A method for a wireless network to provide a voice-to-text memo service to a wireless subscriber associated with a mobile device is provided. The method includes: a) routing an active call path associated with the mobile device to a voice-to-text conversion system, b) capturing audio from the active call path for a period of time, and c) converting the captured audio to a text memo to create a voice-to-text memo. In another embodiment, a method for providing a voice-to-text memo service in a wireless network is provided. Additionally, a wireless network is provided. The wireless network includes: means for determining that a subscriber is properly enrolled in a calling plan, a voice-to-text conversion system, means for routing an active call path to the voice-to-text conversion system, a text messaging system, and means for communicating the text memo from the voice-to-text conversion system to the text messaging system.

19 Claims, 2 Drawing Sheets

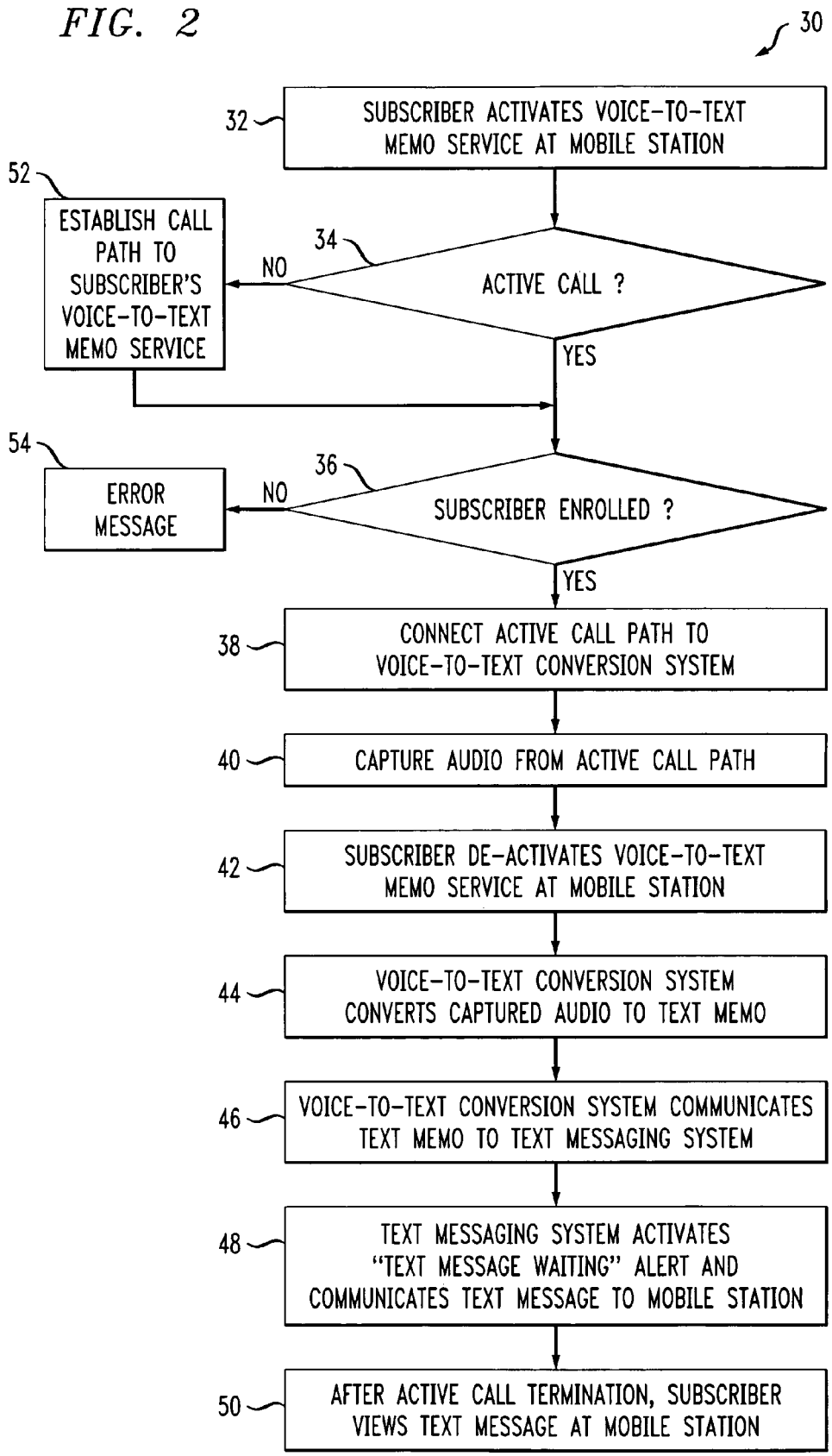

NETWORK SUPPORT FOR VOICE-TO-TEXT MEMO SERVICE

BACKGROUND OF INVENTION

The invention generally relates to a wireless network with a mobile station (MS) and, more particularly, to a method for the wireless network to support voice-to-text memo creation for a call associated with the MS and will be described with particular reference thereto. However, it is to be appreciated that the invention is also amenable to other applications, such as subsequent delivery of the voice-to-text memo to the MS.

It is sometimes inconvenient for a person to write down certain information, such as a telephone number, directions, or appointment details. For example, people often need to note important information while driving or walking, while involved in a telephone conversation, or while performing similar tasks that require the person's attention, concentration, and/or use of both hands. At these times, the person usually can state the important information verbally.

Today, it is likely that the person has possession or access to an MS or similar mobile device capable of wireless communication. The person could state the important information to some type of recording service associated with the mobile device. Wireless networks associated with such mobile devices currently support creation and delivery of text messages (i.e., short message service (SMS)) and creation and delivery of voice messages (i.e., voice mail). However, text message services currently require the message to be entered manually and wireless networks do not currently support creation and delivery of voice-to-text memos.

Thus, there is motivation for wireless networks to provide wireless subscribers with a voice-to-text memo service. Particularly, for capturing a portion of audio from a call path to which their subscriber is a party. This will enable subscribers to record important spoken information for later retrieval as a text memo.

BRIEF SUMMARY OF INVENTION

In one aspect of the invention, a method for a wireless network to provide a voice-to-text memo service to a wireless subscriber associated with a mobile device is provided. The method includes: a) routing an active call path associated with the mobile device to a voice-to-text conversion system, b) capturing audio from the active call path for a period of time, and c) converting the captured audio to a text memo to create a voice-to-text memo.

In another aspect of the invention, a method for providing a voice-to-text memo service in a wireless network is provided. The method includes: a) determining that a subscriber associated with the wireless network is properly enrolled in a calling plan with a voice-to-text memo feature active, wherein the subscriber is associated with a mobile device and the mobile device is associated with the wireless network, b) routing an active call path associated with the mobile device to a voice-to-text conversion system, c) capturing audio from the active call path for a period of time, d) converting the captured audio to text to create a text memo, e) communicating the text memo from the voice-to-text conversion system to a text messaging system, f) communicating a signal to the mobile device to alert the subscriber that the text memo was created, and g) communicating the text memo to the mobile device.

In still another aspect of the invention, a wireless network is provided. The wireless network includes: means for determining that a subscriber associated with the wireless network is properly enrolled in a calling plan with a voice-to-text memo feature active, wherein the subscriber is associated with a mobile device and the mobile device is associated with the wireless network, a voice-to-text conversion system, means for routing an active call path associated with the mobile device to the voice-to-text conversion system, wherein the voice-to-text conversion system captures audio from the active call path for a period of time and converts the captured audio to text to create a text memo, a text messaging system, and means for communicating the text memo from the voice-to-text conversion system to the text messaging system, wherein the text messaging system communicates a signal to the mobile device to alert the subscriber that the text memo was created and communicates the text memo to the mobile device.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

FIG. 2 is a flowchart of an embodiment of a method for a wireless network associated with the telecommunication system of FIG. 1 to provide a voice-to-text memo service to a subscriber.

DETAILED DESCRIPTION

Figure 1:
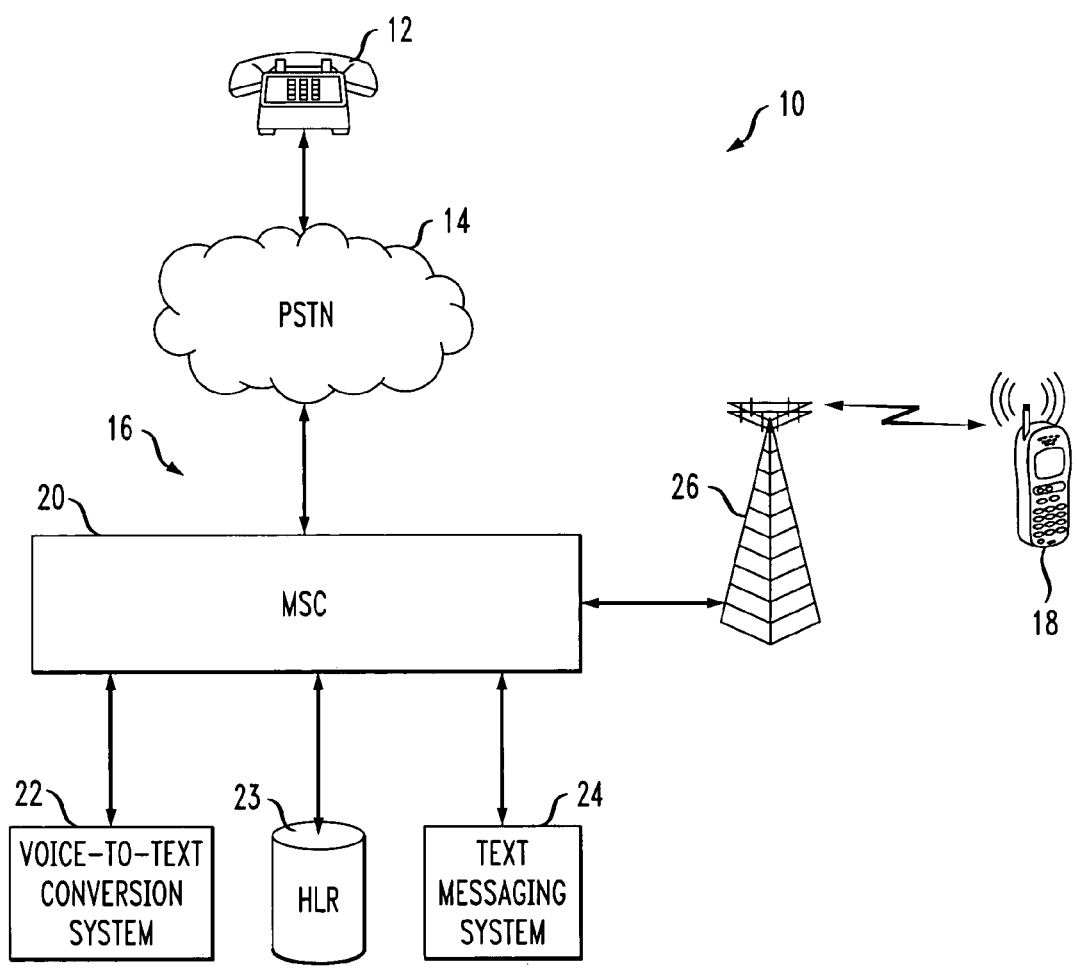
FIG. 1 is a block diagram of an embodiment of a telecommunication system incorporating one aspect of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

With reference to FIG. 1, a telecommunication system 10 includes a landline telephone device 12, a public switched telephone network (PSTN) 14, a wireless network 16, and a mobile station (MS) 18. The wireless network 16 includes a mobile switching center (MSC) 20, a voice-to-text conversion system 22, a home location register (HLR) 23, a text messaging system 24, and a base station (BS) 26. In another embodiment, the voice-to-text conversion system 22 may be included in the MSC 20. The voice-to-text conversion system 22 uses any suitable implementation of existing voice- or speech-to-text conversion technology, including, for example, dictation software. The text messaging system 24 uses any suitable implementation of existing text message communication technology, such as SMS. In general, the wireless network 16 provides voice-to-text memo services to the MS 18. This allows a subscriber associated with the MS 18 to note important information in a voice-to-text memo while engaged in a mobile telephone conversation, for example, while driving or walking. The HLR 23 includes a subscriber database that maintains a record of the subscriber's calling plan associated with the MS. The subscriber's calling plan identifies various features of the wireless network to which the subscriber is subscribed and indicates whether or not service to the subscriber is suspended, for example, for a delinquent or unpaid account.

The voice-to-text memo service allows the wireless network 16 to accept audio (e.g., spoken information) from calls, for example, between the subscriber's MS 18 and the landline telephone device 12. The voice-to-text conversion system 18 translates the audio to textual information and creates a voice-to-text memo. The text messaging system 20 delivers the voice-to-text memo to the subscriber's MS 18 for later viewing by the subscriber or another user. Delivery and retrieval of the voice-to-text memo may be accomplished in the same manner as text message delivery and retrieval associate with SMS. The voice-to-text memo service operates in the same manner for calls originated by the landline telephone device 12 to the MS 18 and vice versa. Moreover, it is understood that the landline telephone device 12 and PSTN 14 may replaced by other types of devices and networks capable of originating and/or receiving voice telephone calls. For example, the landline telephone device 12 may be replaced by a second MS and the PSTN 14 may be replaced by a second wireless network.

In summary, the wireless network 16, in conjunction with the voice-to-text conversion system 22, provides a methodology for the subscriber to request the network to capture a portion of audio (i.e., spoken words) from a wireless telephone call path and convert that audio (i.e., speech) to text. Furthermore, the voice-to-text conversion system 22 provides a methodology for the wireless network 16 to automatically create a voice-to-text memo from the converted text. Additionally, the wireless network 16, in conjunction with the text messaging system 24, provides a methodology for the network to automatically deliver the voice-to-text memo to the MS 18 associated with the wireless telephone call path from which the original audio (i.e., spoken information) was received.

When the voice-to-text memo feature is active in the subscriber's calling plan, during an active call, the subscriber or other user at the MS 18 can request, via a soft-key, dedicated key, or voice command, that the wireless network 16 capture subsequent audio from the call path. The soft-key, for example, can include activation of a certain combination of keys on the standard keypad, activation of one or more keys on the standard keypad in combination with a special function key, or similar combinations of existing keys. The dedicated key, for example, can include activation of a special function key. Activation of a special function key may require the operator to push and hold the key depressed, such as in push-to-talk (PTT) switches. The voice command, for example, can include a phrase, such as "beginning of message" or "start of message," or an acronym or sequence of characters, such as "BOM" or "SOM." After activation of the voice-to-text memo feature, spoken words by either party to the call are captured and converted to text by the voice-to-text conversion system 22. The subscriber may also signal the end of a time period for capturing the spoken information from the MS 18 through either soft-key, dedicated key, or voice command. The soft-key to de-activate the voice-to-text memo feature may be the same or similar to the soft-key for activation. Likewise, the dedicated key to de-activate the voice-to-text memo feature may be the same or similar to the dedicated for activation. The voice command for de-activation, for example, can include a phrase, such as "end of message," or an acronym or sequence of characters, such as "EOM." From the subscriber or other user's activation and de-activation of the voice-to-text memo feature, the wireless network 16 recognizes the beginning and end of the spoken information that is to be converted to text by the speech-to-text conversion system 22.

At the completion of the speech-to-text conversion process, the wireless network 16, in conjunction with the voice-to-text conversion system 22, creates a voice-to-text memo associated with the captured audio. The voice-to-text memo is communicated to the text messaging system 20 and delivered back to the subscriber's MS using, for example, existing SMS features. In one embodiment, if the length of the voice-to-text memo exceeds the capabilities of standard SMS, the voice-to-text memo may be divided into multiple voice-to-text memos that are compatible with standard SMS by the voice-to-text conversion system 22, text messaging system 24, or related processes within the MSC 20. In an alternate embodiment, if the length of the voice-to-text memo exceeds the capabilities of standard SMS, the voice-to-text memo may be truncated due to limitations on the length of messages in standard SMS.

With reference to FIG. 2, a process 30 for a wireless network to provide a voice-to-text memo service to a subscriber begins at step 32 when the subscriber activates the voice-to-text memo service at the MS by activating a start voice-to-text memo control. For example, the start voice-to-text memo control may be a soft-key, dedicated key, or voice command. Next, the MS determines if a call is currently active (step 34). If a call is currently active, at step 36, the MSC determines if the subscriber is properly enrolled in a calling plan with the voice-to-text memo feature active by checking the subscriber database in the HLR. If the subscriber is enrolled, the MSC connects the voice-to-text conversion system to the active call path (step 38). The connection to the active call path may using techniques known for connecting a third party to a three-way call, connecting two parties in a two-way call, or any other suitable technique for connecting a party to an active call path.

At step 40, the voice-to-text conversion system captures audio from the active call path. Next, in the scenario being described, the subscriber de-activates the voice-to-text memo service at the MS by activating a stop voice-to-text memo control (step 42). For example, the stop voice-to-text memo control may be a soft-key, dedicated key, or voice command. In another scenario, termination of the active call also de-activates the voice-to-text memo service. At step 44, the voice-to-text conversion system converts the captured audio to a text memo. Next, the voice-to-text conversion system communicates the text memo to the text messaging system via, for example, the MSC (step 46) for management and subsequent delivery to the MS. In one embodiment, if the length of the text memo exceeds the capabilities of standard SMS, in conjunction with step 44, the voice-to-text conversion system may divide the text memo into multiple voice-to-text memos that are compatible with standard SMS. In another embodiment, if the length of the text memo exceeds the capabilities of standard SMS, in conjunction with step 46, the text messaging system may divide the text memo into multiple voice-to-text memos that are compatible with standard SMS. In still another embodiment, if the length of the text memo exceeds the capabilities of standard SMS, between steps 44 and 46, the MSC may divide the text memo into multiple voice-to-text memos that are compatible with standard SMS.

At step 48, the text messaging system activates, for example, a "text message waiting" alert on the MS associated with standard SMS capabilities and communicates the text memo to the MS. The alert may include an audible cue, a vibratory cue, an indicator cue, or any combination thereof. In another embodiment, the text messaging system does not communicate the text memo to the MS until the subscriber initiates a standard text message retrieval process from the MS. Next, after the active call is terminated, the subscriber views the text memo at the MS in the same manner as a standard SMS text message (step 50).

If the MS determines a call is not currently active in step 34, the MSC establishes a call path between the MS and the subscriber's voice-to-text memo service (step 52). Next, the process advances from step 52 to step 36 and continues as described above.

If the MSC determines the subscriber is not currently enrolled in a calling plan with the voice-to-text memo feature active in step 36, the MSC communicates an error message to the MS and the process ends (step 54).

The various steps in the foregoing process 30 may be implemented by hardware, software, and/or combinations thereof within the wireless network 16 (FIG. 1), including one or more of the MSC 20 (FIG. 1), voice-to-text conversion system 22 (FIG. 1), HLR 23 (FIG. 1), and text messaging system 24 (FIG. 1), and/or MS 18 (FIG. 1). More specifically, steps 32, 36, 38, 42, 46, 52, and 54 may be implemented at least in part by hardware, software, and/or combinations thereof within the MSC 20 (FIG. 1). Steps 38, 40, 44, and 46 may be implemented at least in part by hardware, software, and/or combinations thereof within the voice-to-text conversion system 22 (FIG. 1). Steps 36 may be implemented at least in part by hardware, software, and/or combinations thereof within the HLR 23 (FIG. 1). Steps 46, 48, and 50 may be implemented at least in part by hardware, software, and/or combinations thereof within the text messaging system 24 (FIG. 1). Steps 32, 34, 42, 48, 50, 52, and 54 may be implemented at least in part by hardware, software, and/or combinations thereof within the MS 18 (FIG. 1).

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. A method for a wireless network to provide a voice-to-text memo service to a wireless subscriber associated with a mobile device, the method including:
   receiving a request initiated by the subscriber via a command signal;
   determining that a subscriber associated with the wireless network is properly enrolled in a calling plan with voice-to-text memo feature active, wherein the subscriber is associated with a mobile device and the mobile device is associated with the wireless network;
   routing an active call path associated with the mobile device to a voice-to-text conversion system, where the active call path connects at least two parties, where the subscriber is one of the parties;
   capturing audio from the active call path for a period of time; and
   converting the captured audio to a text memo to create a voice-to-text memo.

2. The method as set forth in claim 1, the method further including:
   communicating the voice-to-text memo from the voice-to-text conversion system to a text messaging system.

3. The method as set forth in claim 2, the method further including:
   if the voice-to-text memo exceeds a predetermined length, dividing the voice-to-text memo into multiple voice-to-text memos such that none of the multiple voice-to-text memos exceed the predetermined length.

4. The method as set forth in claim 2, the method further including:
   communicating a signal to the mobile device to alert the subscriber that the voice-to-text memo was created.

5. The method as set forth in claim 4, the method further including:
   communicating the voice-to-text memo to the mobile device.

6. The method as set forth in claim 5 wherein the voice-to-text memo is communicated to the mobile device in response to a voice-to-text memo retrieval process initiated by the subscriber at the mobile device.

7. The method as set forth in claim 1, the method further including:
   activating the voice-to-text memo service in response to the subscriber activating a start voice-to-text memo control at the mobile device.

8. The method as set forth in claim 7, the method further including:
   de-activating the voice-to-text memo service in response to at least one of the subscriber activating a stop voice-to-text memo control at the mobile device and termination of the active call path.

9. The method as set forth in claim 7, the method further including:
   determining if a call associated with the mobile device is currently active; and
   if a call associated with the mobile device is not currently active, establishing an active call path between the mobile device and the voice-to-text memo service associated with the subscriber.

10. A method for providing a voice-to-text memo service in a wireless network, the method including:
    receiving a request initiated by the subscriber via a command signal;
    determining that a subscriber associated with the wireless network is properly enrolled in a calling plan with a voice-to-text memo feature active, wherein the subscriber is associated with a mobile device and the mobile device is associated with the wireless network;
    routing an active call path associated with the mobile device to a voice-to-text conversion system, the active call path being a connection between the subscriber and at least one other party;
    capturing audio from the active call path for a period of time;
    converting the captured audio to text to create a text memo;
    communicating the text memo from the voice-to-text conversion system to a text messaging system;
    communicating a signal to the mobile device to alert the subscriber that the text memo was created; and
    communicating the text memo to the mobile device.

11. The method as set forth in claim 10, the method further including:

if the text memo exceeds a predetermined length, dividing the text memo into multiple text memos such that none of the multiple text memos exceed the predetermined length.

12. The method as set forth in claim 11 wherein the text memo is communicated to the mobile device in response to a text memo retrieval process initiated by the subscriber at the mobile device.

13. The method as set forth in claim 10, the method further including:
activating the voice-to-text memo service in response to the subscriber activating a start voice-to-text memo control at the mobile device.

14. The method as set forth in claim 13, the method further including:
de-activating the voice-to-text memo service in response to at least one of the subscriber activating a stop voice-to-text memo control at the mobile device and termination of the active call path.

15. The method as set forth in claim 13, the method further including:
determining if a call associated with the mobile device is currently active; and
if a call associated with the mobile device is not currently active, establishing an active call path between the mobile device and the voice-to-text memo service associated with the subscriber.

16. A wireless network, including:
means for receiving a request initiated by the subscriber via a command signal;
means for determining that a subscriber associated with the wireless network is properly enrolled in a calling plan with a voice-to-text memo feature active, wherein the subscriber is associated with a mobile device and the mobile device is associated with the wireless network;
a voice-to-text conversion system;
means for routing an active call path associated with the mobile device to the voice-to-text conversion system, wherein the active call path is a connection where the subscriber is a party and the voice-to-text conversion system captures audio from the active call path for a period of time and converts the captured audio to text to create a text memo;
a text messaging system; and
means for communicating the text memo from the voice-to-text conversion system to the text messaging system, wherein the text messaging system communicates a signal to the mobile device to alert the subscriber that the text memo was created and communicates the text memo to the mobile device.

17. The wireless network as set forth in claim 16, further including:
means for dividing the text memo into multiple text memos if the text memo exceeds a predetermined length such that none of the multiple text memos exceed the predetermined length.

18. The wireless network as set forth in claim 16, further including:
means for activating the voice-to-text memo service in response to the subscriber activating a start voice-to-text memo control at the mobile device.

19. The wireless network as set forth in claim 18, further including:
means for determining if a call associated with the mobile device is currently active; and
means for establishing an active call path between the mobile device and the voice-to-text memo service associated with the subscriber if a call associated with the mobile device is not currently active.

* * * * *